United States Patent [19]
Okajima et al.

[11] Patent Number: 5,917,940
[45] Date of Patent: Jun. 29, 1999

[54] THREE DIMENSIONAL REFERENCE IMAGE SEGMENTING METHOD AND DEVICE AND OBJECT DISCRIMINATION SYSTEM

[75] Inventors: Kenji Okajima; Masanobu Miyashita, both of Tokyo, Japan

[73] Assignee: NEC Corporation, Tokyo, Japan

[21] Appl. No.: 08/787,928

[22] Filed: Jan. 23, 1997

[30] Foreign Application Priority Data

Jan. 23, 1996 [JP] Japan ................................. 8-009473

[51] Int. Cl.⁶ ....................................................... G06K 9/34
[52] U.S. Cl. ........................ 382/173; 382/154; 382/191; 382/280; 348/20
[58] Field of Search ................................. 382/154, 173, 382/191, 195, 225, 280, 211; 348/20, 47; 395/119

[56] References Cited

U.S. PATENT DOCUMENTS

| | | | |
|---|---|---|---|
| 5,084,818 | 1/1992 | Machida ................................. | 382/280 |
| 5,089,777 | 2/1992 | Iino et al. ............................... | 324/309 |
| 5,119,189 | 6/1992 | Iwamoto et al. ........................ | 348/47 |
| 5,163,099 | 11/1992 | Osaki et al. ............................ | 382/191 |
| 5,239,595 | 8/1993 | Takemura et al. ...................... | 382/211 |
| 5,247,583 | 9/1993 | Kato et al. .............................. | 382/225 |
| 5,500,671 | 3/1996 | Andersson et al. ..................... | 348/20 |

FOREIGN PATENT DOCUMENTS 2-156387  6/1990  Japan ................................ G06K 9/62
7-287762  10/1995  Japan ................................ G06T 7/00

OTHER PUBLICATIONS

Lades et al., "Distortion Invariant Object Recognition in the Dynamic Link Architecture", IEEE Transactions on Computers, vol. 42, No. 3, Mar. 1993.

*Primary Examiner*—Joseph Mancuso
*Assistant Examiner*—Gilberto Frederick, II
*Attorney, Agent, or Firm*—Foley & Lardner

[57] ABSTRACT

In a three-dimensional reference image segmenting method and device, a two-dimensional image of a reference object and a shape data of a pattern obtained by transforming the image is stored together with depth data of the reference object in a memory as a reference pattern. On the basis of a local Fourier transform image date of an input image supplied from an image transform unit and the reference data of the reference pattern read out from the memory, a deform amount estimating unit calculates the amount of deform (displacement vector) required to make both the images coincident with each other to a possible extent. An inverse Fourier transform unit generates a deformed reference image by an local inverse Fourier transform based on the displacement vector and the data of the local Fourier transform image data of the reference pattern. On the basis of the deformed reference image thus generated, an image segmentation unit extracts a reference object image from within the input image, and the reference object image thus extracted is outputted from an image output unit.

11 Claims, 7 Drawing Sheets

LEFT=3Δ/4
RIGHT=−Δ/4

LEFT=Δ
RIGHT=0

LEFT=2Δ
RIGHT=Δ

LEFT EYE IMAGE

RIGHT EYE IMAGE

INPUT IMAGE

FINAL SIMILARITY DATA

REFERENCE IMAGE "a"

SEGMENTATION RESULT

REFERENCE IMAGE "b"

SEGMENTATION RESULT

THREE DIMENSIONAL REFERENCE IMAGE SEGMENTING METHOD AND DEVICE AND OBJECT DISCRIMINATION SYSTEM

BACKGROUND OF THE INVENTION

1. Field of the Invention

The present invention relates to a three-dimensional reference image segmenting method and device and an object discrimination system, and more specifically to a three-dimensional reference image segmenting method and device for extracting only a previously stored three-dimensional reference image from an input three-dimensional image, and and an object discrimination system utilizing the same method.

2. Description of Related Art

In the prior art, there has been known an image processing method for picking up or extracting a reference image included in an input image ("segmentation"). In this specification, the verb "segment" is often used as the verb meaning the "segmentation".

Briefly, an input image is divided into small image domains permitted to be overlapped to each other, and is Fourier-transformed for each small image domain. Further, each small image domain is transformed into the pattern of a Fourier power spectrum, and a template matching processing (segmentation) is conducted between the pattern of the Fourier power spectrum and a previously prepared reference image (standard pattern) By using as a mask a "candidate" pattern thus extracted or segmented, the pattern of the Fourier transformation is filtered, and then, a inverse Fourier transformation is conducted. Thus, a pattern matching resistive to noise is conducted by using the pattern obtained by the inverse Fourier transformation. One example of this method is disclosed in Japanese Patent Application Laid-open Publication No. JP-A-02-156387.

However, the above mentioned prior art method can process only a two-dimensional image. In other words. the above mentioned prior at method cannot be applied to the case of segmenting a previously stored three-dimensional reference image from a three-dimensional input image. Under this circumstance, in the prior art, there is proposed a method for extracting or segmenting, a three-dimensional reference image from a input image, by extending the above mentioned prior art method to input images which correspond to images obtained by viewing an object by a left eye and a right eye, respectively. In brief each of the input images is divided into small image domains permitted to be overlapped to each other, and is Fourier-transformed for each small image domain. Parallax between a left eye image and a right eye image is expressed as a phase difference in a Fourier transformation. This method is disclosed in Japanese Patent Application Laid-open Publication No. JP-A-07-287762.

According to this second prior art method, it is possible to precisely extract or segment only a target image from even an image including not only a reference image but also an image other than the reference image, by calculating the phase difference in a Fourier transformation of left and right eye images, for input images corresponding to the left eye image and the right eye image and a reference image, and predicting, from the input images, an image which is consistent with the reference image, in factors including the parallax.

In Japanese Patent Application No. Heisei 06-184785 filed on Aug. 5, 1994 and laid open as Japanese Patent Application Laid-open Publication No. JP-A-08-050654 on Feb. 20, 1996, the inventor of this application has proposed a three-dimensional reference image segmenting method and device, capable of precisely segmenting only a reference image even if a reference image and a three-dimensional image to be extracted included in an input image are difference in a position of a depth direction. In brief, a parallax between a left eye image and a right eye image in the reference image is expressed as a power spectrum pattern, and on the other hand, a power spectrum pattern of the three-dimensional image to be extracted is obtained from a spatial frequency filtering which uses only a maximum power spectrum of the reference image and the input image, and therefore which does not include information concerning the phase difference between the left eye image and the right eye image.

In the above mentioned three-dimensional reference image segmenting method and device, the parallax between the left eye image and the right eye image is expressed by obtaining a sum of vectors, on a complex plane, of local Fourier transformed images for the left eye image and the right eye image, and then, a pattern in change of the vector sum corresponding to the change of the phase difference, or expressed as the power spectrum pattern corresponding to the change of the phase difference. Thereafter, the image having the power spectrum pattern similar to that of the reference image is predicted within the input image, so that segmentation of the three-dimensional reference image is conducted. Accordingly, even if the same image as the reference image is included in the input image, if the reference image and the image to be extracted included in the input image are different in the power spectrum pattern, a precise segmentation cannot be executed. This is disadvantageous.

Here, the difference in the power spectrum pattern between the reference image and the image to be extracted included in the input image, is attributable to the followings Assume that, in a stereogram as shown in FIGS. 3A and 3B, a left eye image as shown in FIG. 3A and a right eye image as shown in FIG. 3B are used as the reference image, and on the other hand, the input image is constituted of an image including a doll image corresponding to the situation in which a doll whose image is shown in FIGS. 3A and 3B is rotated around an axis extending from a top of a head of the doll toward to legs of doll. In this situation, a point before a converging point and another point behind the converging point are different in the parallax between the left eve image and the right eye image. This difference causes the difference in the power spectrum pattern between the reference image and the image to be extracted included in the input image.

In other words, the case that the power spectrum pattern is different between the reference image and the image to be extracted included in the input image, corresponds to the case that the image to be extracted included in the input image involves a rotation which causes to change the depth direction, and therefore, between the reference image and the image to be segmented, a sighting view is different because of difference in depth. In this situation, the above mentioned three-dimensional reference image segmenting method and device cannot execute a precise segmentation of the target image.

One means for overcoming the problem in the case that the power spectrum pattern is different between the reference image and the image to be extracted included in the input image, is disclosed by Martin Lades, Jan C. Vorbrüggen, Joachim Buhmann, Jörg Lange, Christoph v.d. Malsburg, Rolf P. Würtz, and Wolfgang Konen. "Distortion Invariant Object discrimination in the Dynarnic Link Architecture", IEEE Transactions on Computers, Vol. 42, No. 3, pp.300–311 (March 1993), the disclosure of which is incorporated by reference in its entirety into this application.

This approach is featured in that a difference between a reference image and an input image is investigated for each local image domain by using a two-dimensional projected image of a three-dimensional image. However, this approach is disadvantageous in that (1) the three-dimensional image cannot be directly handled, and the two-dimensional projected image is necessary; (2) the image of each local image domain is displayed in a bit map format, and the amount of change which gives the maximum degree of matching is investigated while shifting the image in an X direction and in a Y direction. Therefore, the processing needs a vary long time, and cannot practically be applied to a large scale image; and (3) image deformation in each local image domain lowers the capability of discrimination between different objects.

SUMMARY OF THE INVENTION

Accordingly, it is an object of the present invention to provide three-dimensional reference image segmenting method and device which have overcome. the above mentioned defect of the conventional one.

Another object of the present invention is to provide three-dimensional reference image segmenting method and device, capable of executing a precise segmentation even if the power spectrum pattern is different between the reference image and the image to be extracted included in the input image.

Still another object of the present invention is to provide three-dimensional reference image segmenting method and device, capable of executing a precise segmentation for a large scale image without using a two-dimensional projected image.

A further object of the present invention is to provide three-dimensional reference image segmenting method and device, capable of executing an accurate object discrimination without lowering a capability of discrimination for different objects, even if a background object exists and even if an object image changes because of a rotation of the object or another cause.

The above and other objects of the present invention are achieved in accordance with the present invention by a three-dimensional reference image segmenting method comprising the steps of:

dividing each of left and right images respectively corresponding to a left eye view and a right eye view obtained by looking a reference image to be segmented, by a left eye and a right eye, respectively, into small image domains permitted to be overlapped to each other;

executing a Fourier transform for each of the small image domains to calculate a local Fourier transform image data;

calculating and storing a power spectrum pattern from a sum, including a phase difference, of the local Fourier transform image data of the left and right images;

calculating on the basis of the power spectrum pattern a parallax between the left and right images for each of the small image domains;

dividing one of left and right images respectively corresponding to a left eye view and a right eye view obtained by looking an input image containing the reference image, by a left eye and a right eye, respectively, into small image domains permitted to be overlapped to each other;

executing a Fourier transform for each of the small image domains of the input image to calculate a local Fourier transform image data;

estimating a difference in parallax and in power spectrum pattern between the reference image and an image to be extracted within the input image, by using as a constraint condition the parallax between the left and right images of the reference image for each local image domain, on the basis of the local Fourier transform image data of the input image, the power spectrum pattern stored of the reference image and the parallax stored between the left and right images of the reference image for each local image domain; and on the basis of the result of the above estimation, segmenting from the input image only an image having a power spectrum pattern similar to that of the reference image.

According to another aspect of the present invention, there is provided a three-dimensional reference image segmenting device comprising:

an image input means receiving left and right images respectively corresponding to a left eye view and a right eye view obtained by looking a reference image to be segmented, by a left eye and a right eye, and also receiving one of left and right images respectively corresponding to a left eye view and a right eye view obtained by looking an input image containing the reference images by a left eye and a right eye, respectively;

a local Fourier transform means receiving the left and right images from the image input means, for dividing each of the left and right images into small image domains permitted to be overlapped to each other, and executing a Fourier transform for each of the small image domains to calculate a local Fourier transform image data;

a power spectrum pattern calculating means for calculating a power spectrum pattern from a sum, including a phase difference, of the local Fourier transform image data of the left and right images of the reference image outputted from the local Fourier transform means;

a local parallax calculating means for calculating, on the basis of the power spectrum pattern outputted from the power spectrum pattern calculating means, a parallax between the left and right images of the reference image for each of the small image domains;

a memory means receiving and storing the power spectrum pattern outputted from the power spectrum pattern calculating means and the parallax for each of the small image domains outputted from the local parallax calculating means;

a same image predicting means receiving, when the input image containing the reference image is inputted to the image input means, the local Fourier transform image data of the input image, outputted from the local Fourier transform means, and the power spectrum pattern of the reference image and the parallax between the left and right images of the reference image for each of the small image domains, outputted from the memory means, the same image predicting means estimating a difference in parallax and in power spectrum pattern between the reference image and an image to be extracted within the input image, by using as a constraint condition the parallax between the left and right images of the reference image for each local image domain, and calculating a local Fourier transform image of the image to be extracted within the input image;

a local inverse Fourier transform means receiving from the same image predicting means the local Fourier transform image of the image to be extracted within the input image, for executing a local inverse Fourier transform to the received local Fourier transform image of the image to be segmented, to output data of left and right images of aid image to be segmented; and an average calculating and outputting means for calculating and outputting a geometric average between the data of left and right images outputted from the local inverse Fourier transform means and data of the input image containing the reference image outputted from the image input means.

With this arrangement, since the segmentation is executed after the reference image is deformed by using the depth data of the reference image as the constraint condition, it is possible to avoid an object which is similarly to but precisely different from a reference object, from being erroneously discriminated as the same as the reference object, which would otherwise have occurred because of an unlimited deform.

According to still another aspect of the present invention, there is provided a three-dimensional reference image segmenting device comprising:

a reference data generating means receiving left and right images respectively corresponding to a left eye view and a right eye view obtained by looking a reference object to be segmented, by a left eye and a right eye, and also dividing each of the left and right images into small image domains permitted to be overlapped to each other, and calculating a depth data of the reference object on the basis of parallax between the left and right images for each of the small image domains, the reference data generating means also generating a shape data concerning a predetermined one image of the received left and right images;

a memory means receiving and storing the depth data and shape data generated by the reference data generating means;

an image input means receiving an input image to be processed;

a reference image deform means receiving the input image supplied from the memory means, and the shape data read out from the memory, and for deforming the reference image to make the reference image coincident with the input image to a possible maximum extent using as a constraint condition the depth data read out from the memory;

an image segmentation means receiving the deformed reference image outputted from the reference image deform means and the input image supplied from the image input means, for segmenting the input image with reference with the deformed reference image; and an image output means for outputting the result of the segmentation obtained in the image segmentation means.

The three-dimensional reference image segmenting method and device as mentioned above, is characterized in that, on the basis of the local Fourier transform image data obtained when the input image containing the reference image is inputted, and the stored maximum spectrum pattern concerning the reference image and the stored parallax between the left and right images of the reference image for each local image domain, and by using as the constraint condition the parallax between the left and right images of the reference image for each local image domain, a difference in parallax and in power spectrum pattern between the reference image and an image to be extracted within the input image is predicted, and then, a local Fourier transform image is calculated. Therefore, even if the reference image and the image to be extracted within the input image are different in power spectrum pattern because the parallax between a left eye image and a right eye image is different to some degree, it is possible to judge that both the images are substantially the same one the basis of a prediction under a certain constraint condition.

In a preferred embodiment of the three-dimensional reference image segmenting device, the reference data generating means comprises:

an image transform means for executing a Fourier transform to the input image supplied from the image input means, for each of the small image domains, to calculate a local Fourier transform image;

a deform amount estimating means receiving the local Fourier transform image supplied from the image transform means and the shape data read out from the memory, for examining, for each of the small image domains, by what amount of displacement of the reference image and to what extent the reference image coincides with the input image, and for calculating and selecting, as a temporary displacement vector, for each of the small image domains, a displacement vector which makes the reference image coincident with the input image to a maximum extent, from displacement vectors, for each small image domain, generated when the reference object is rotated or displaced, by using as a constraint condition the depth data read out from the memory; and an inverse transform means receiving the displacement vector for each small image domain outputted from the deform amount estimating means and the shape data read out from the memory, for executing the shape data with reference with the displacement vector, so as to generating the deformed reference image.

Furthermore, in the preferred embodiment of the three-dimensional reference image segmenting device, the reference data generating means comprises:

a reference data generating image input means receiving left and right images respectively corresponding to a left eye view and a right eye view obtained by looking the reference objected to be segmented, by a left eye and a right eye, respectively;

a reference data generating image transform means for dividing each of the left and right images supplied from the reference data generating image input means, into small image domains permitted to be overlapped to each other, and executing a Fourier transform for each of the small image domains to calculate a local Foarier transform image data;

a local parallax calculating means for calculating, on the basis of the local Fourier transform image data for each of the left and right images, outputted from the reference data generating image transform means, a parallax between the left and right images of the reference image for each of the small image domains, which maximizes an interdependent correlation function between between the left and right images; and a reference data writing means for writing, as the shape data into the memory, the local Fourier transform image data of one image, selected from the local Fourier transform image data of the left and right images calculated by the reference data generating image transform means, the reference data writing means writing, as the depth data into the memory, the parallax calculated in the local parallax calculating means.

According to a further aspect of the present invention, there is provided an object discrimination system comprising:

a reference data generating means receiving a plurality of pairs of left and right images each pair respectively corresponding to a left eye view and a right eye view obtained by looking each of a plurality of reference objects to be discriminated, by a left eye and a right eye, and also dividing each of the left and right images into small image domains permitted to be overlapped to each other, and calculating a depth data of each of the reference objects on the basis of parallax between the left and right images for each of the small image domains, the reference data generating means also generating a shape data of each of the reference objects on the basis of a predetermined one image of each pair of left and right images of the received plurality of pairs of left and right images;

a memory means receiving and storing the depth data and shape data of the plurality of reference objects. generated by the reference data generating means;

an image input means receiving an input image to be processed;

a reference image deform means receiving the input image supplied from the memory means, and the shape data of the plurality of reference objects, read out from the memory, and for executing a pattern matching processing between the input image and each of the shape data of the plurality of reference objects, to calculate the degree of similarity between the input image and each of the shape data of the plurality of reference objects, the reference image deform means also selecting as candidate patterns, reference objects of a predetermined number counted from a reference object having the highest degree of similarity in the order of the degree of similarity or reference objects having the degree of similarity larger than a predetermined threshold, the reference image deform means further deforming each of the candidate patterns to make the candidate pattern coincident with the input image to a possible maximum extent using as a Constraint condition the depth data read out from the memory;

an image segmentation means receiving the deformed reference image of each of the candidate patterns, outputted from the reference image deform means, and the input image supplied from the image input means, for segmenting the input image with reference with the deformed reference image of each of the candidate patterns; and a pattern discriminating means receiving the result of the segmentation outputted from the image segmentation means and the deformed reference image of each of the candidate patterns, outputted from the reference image deform, means, for calculating the degree of final similarity between the extracted input image outputted from the image segmentation means and the deformed reference image of each of the candidate patterns, the pattern discriminating means outputting, when a highest one of the calculated degrees of final similarity exceeds a predetermined value, the result of discrimination indicating the pattern having the highest degree of final similarity.

With this arrangement, since a correct candidate pattern has a maximum degree of final similarity, a correct object discrimination can be realized even if a background exits or even if the image of an object to be discriminated is deformed because of a rotation in a depth direction, parallel displacement, enlargement or reduction in scale, and/or an in-plane rotation.

The above and other objects, features and advantages of the present invention will be apparent from the following description of preferred embodiments of the invention with reference to the accompanying drawings.

DESCRIPTION OF THE PREFERRED EMBODIMENTS

First Embodiment

Figure 1:
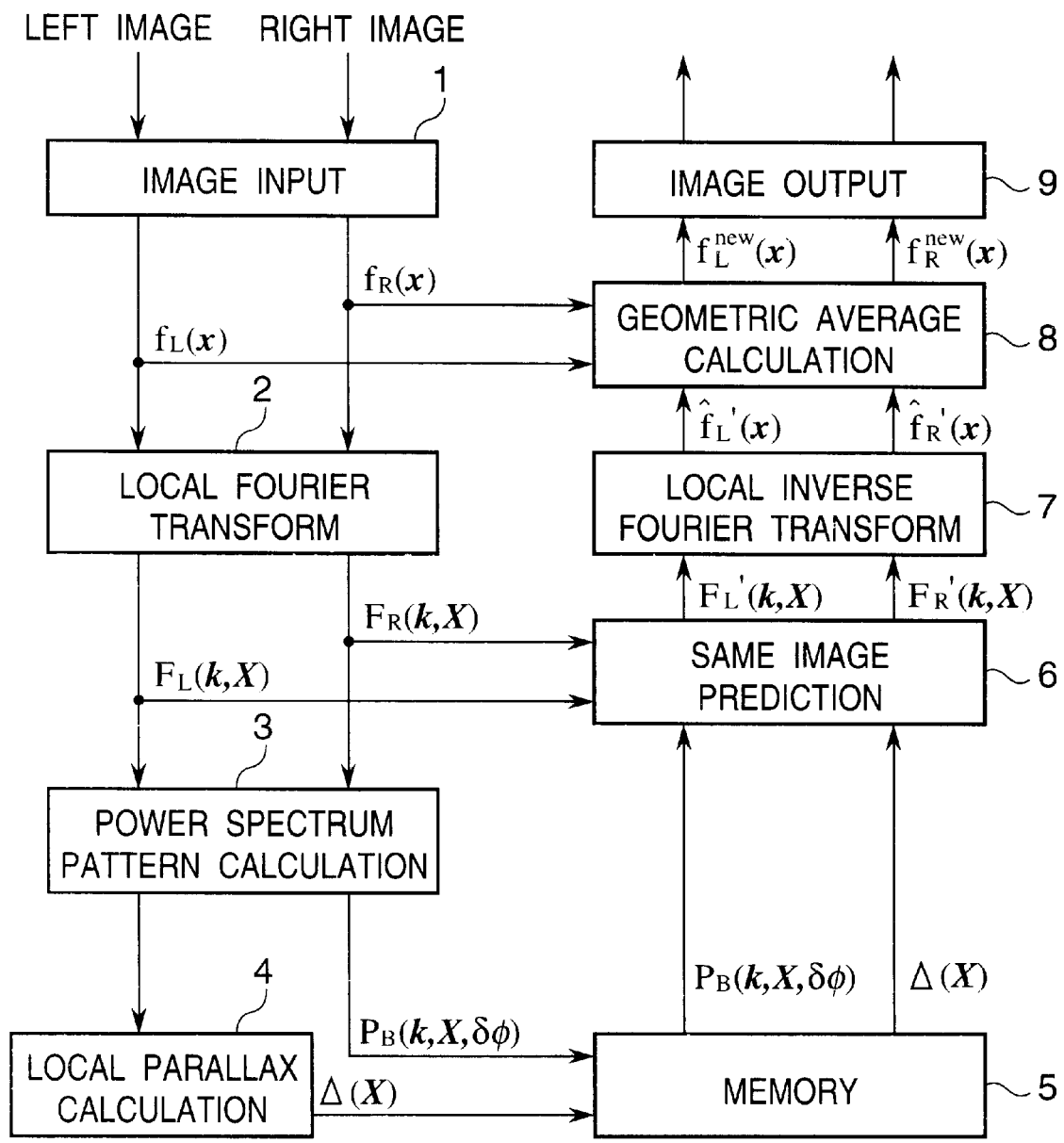
FIG. 1 is a block diagram of a first embodiment of the three-dimensional reference image segmenting device in accordance with the present invention.

Referring to FIG. 1, there is shown a block diagram of a first embodiment of the three-dimensional reference image segmenting device in accordance with the present invention.

The shown three-dimensional reference image segmenting device includes an image input unit 1, a local Fourier transform calculating unit 2, a power spectrum pattern calculating unit 3, a local parallax calculating unit 4, a memory 5, a same image predicting unit 6, a local inverse Fourier transform calculating unit. a geometric average calculating unit 8, and an output unit 9, which are connected as shown.

Figure 2A:
FIGS. 2A, 2B and 2C are images for illustrating two-dimensional images reconstructed conveniently by using fitting parameters.
Figure 2B:
Figure 2C:
Figure 3A:
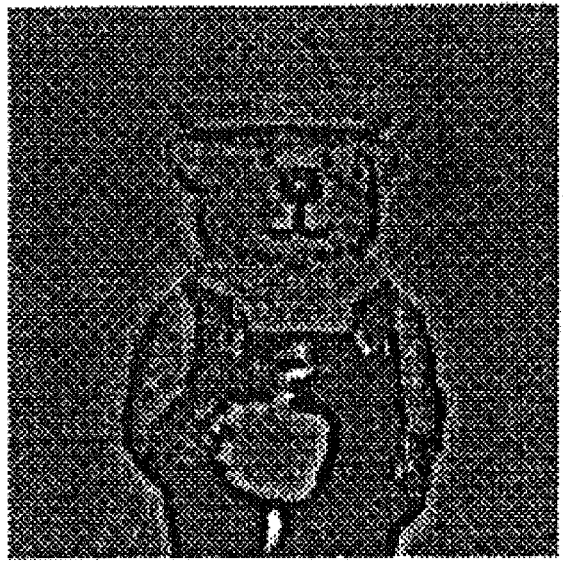
FIGS. 3A and 3B are images for illustrating a case that the power spectrum pattern is different between the reference image and the image to be extracted included in the input image.
Figure 3B:
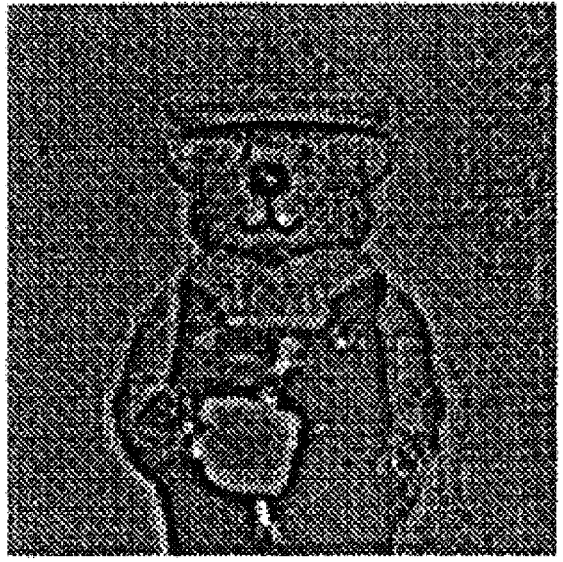

First, a method for generating a reference image data will be described with reference to FIGS. 2A, 2B and 2C, which are images for illustrating two-dimensional images reconstructed conveniently by using fitting parameters.

Left and right images respectively corresponding to a left eye view and a right eye view obtained by looking a reference image to be segmented, by a left eye and a right eye, respectively, are inputted through the image input unit 1 to the local Fourier transform calculating unit 2 as $f_L(x)$ and $f_R(x)$, respectively. In the local Fourier transform calculating unit 2, each of the left eye view and the right eye view inputted is divided into small image domains permitted to be overlapped to each other, and thereafter, the Fourier transform is conducted for each small image domain (local Fourier transform). This local Fourier transform is expressed by the following equation (1):

$$F_\mu(k, X) = \sum_x f_\mu(x) G_\sigma(x - X) \exp[-ik(x - X)]$$

$$G_\sigma(x - X) = \exp\left[-\frac{1}{2\sigma^2}\{(x - X)^2 + (y - Y)^2\}\right] \quad (1)$$

$$(x, y) = x, (X, Y) = X, \mu = L \text{ or } R$$

where $\mu$ is an index for distinguishing the left eye view and the right eye view from each other, and $f_\mu(x)$ is indicative of the input image.

Therefore, $f_L(x)$ is indicative of the left eye view, and $f_R(x)$ is indicative of the right eye view.

$G\sigma(x-X)$ indicates a Gaussian window, "x" is a coordinate of the input image, and X is a center coordinate of the Gaussian window in the space of the input image.

Next, a relation between the result of the local Fourier transform obtained by the local Fourier transform calculating unit 2 in accordance with the equation (1) and the parallax will be described. Here, assume that the local Fourier transform image of the left eye image and the local Fourier transform image of the right eye image are substantially equal in magnitude, but have a phase difference $\delta\phi$. Under this assumption, the following relation holds between the local Fourier transform image of the left eye image and the local Fourier transform image of the right eye image.

$$F_R(k,X) \approx F_L(k,X) \exp(-i\delta\phi) \quad (2)$$

On the other hand, if there is a parallax $\Delta$ between the left eye image and the right eye image, namely, if it is possible to express $f_R(x) \approx f_L(x-\Delta)$, the local Fourier transform image of the right eye image can be expressed as follows by using the local Fourier transform image of the left eye image:

$$F_R(k,X) \approx F_L(k,X) \exp(-ik\Delta) \quad (3)$$

From the equations (2) and (3), the following relation can be found between the phase difference $\delta\phi$ between the local Fourier transform image of the left eye image and the local Fourier transform image of the right eye image and the parallax $\Delta$ between the left eye image and the right eye image.

$$\delta\phi = k\Delta \pmod{2\pi}$$

The result of the local Fourier transform of the equations (1) to (3), obtained in the local Fourier transform calculating unit 2, is supplied to the power spectrum pattern calculating unit 3, in which the local Fourier transform image of the left eye image is added to the local Fourier transform image of the right eye image added with a phase term, and thereafter, a square of the result of the addition is outputted as the power spectrum pattern. Namely, the result of the addition of the local Fourier transform image of the left eye image with the local Fourier transform image of the right eye image added with the phase tej,jmn is expressed, on the basis of the equations (2) and (3), as the following equation (4), and the power spectrum pattern is expressed as the following equation (5).

$$F_B(k,X,\delta\phi) = F_L(k,X) + F_R(k,X) \exp(i\delta\phi) \quad (4)$$

$$P_B(k,X,\delta\phi) = |F_L(k,X) + F_R(k,X) \exp(i\delta\phi)|_2 \quad (5)$$

Here, if the equation (3) is substituted into the equation (5), $P_B(k,X,\delta\phi)$ becomes maximum when $\delta\phi = k\Delta \pmod{2\pi}$ is satisfied. Therefore, it is possible to introduce the parallax $\Delta$ from this power spectrum pattern. The power spectrum pattern calculating unit 3 outputs the obtained power spectrum pattern $P_B(k,X,\delta\phi)$ of the reference image to the memory 5 to cause the memory 5 to store the obtained power spectrum pattern $P_B(k,X,\delta\phi)$ of the reference image. The power spectrum pattern calculating unit 3 also outputs the obtained power 5 spectrum pattern $P_B(k,X,\delta\phi)$ of the reference image to the local parallax calculating unit 4.

This local parallax calculating unit 4 calculates the parallax in a local image domain between the left eye image and the right eye image, on the basis of the received power spectrum pattern, and in accordance with the following equation (6):

$$\Delta(X) = \arg_\Delta[\text{Max}(Z(X, \Delta))]$$

$$Z(X, \Delta) = \frac{1}{2} \int dk [P_B(k, X)]_{\text{MAX}} \exp[i\delta\phi_{\text{max}}(k, X)] \exp(ik\Delta) \quad (6)$$

Here, $\delta\phi_{max}(k,X)$ represents the phase difference $\delta\phi$ which maximizes the power spectrum pattern $P_B(k,X,\delta\phi)$, and $[P_B(k,X,\delta\phi)]_{max}$ indicates the maximized power spectrum pattern.

The local parallax calculating unit 4 outputs the parallax $\Delta(X)$ in each local image domain between the left eye image and the right eye image, which is calculated in accordance with the equation (6), to the memory 5 to cause the memory 5 to store the parallax $\Delta(X)$.

Thus, the power spectrum pattern for the reference image and each local parallax between the left eye image and the right eye image for the reference image are stored in the memory 5.

Next, a method for extracting or segmenting from an input image an image of the same object as that of the reference image, will be described.

First, left and right images respectively corresponding to a left eye view and a right eye view obtained by looking an input image containing the reference image, by a left eye and a right eye, respectively, are inputted through the image input unit 1 to the local Fourier transform calculating unit 2 as $f_L(x)$ and $f_R(x)$, respectively. In the local Fourier transform calculating unit 2, each of the left eye view and the right eye view inputted is divided into small image domains permitted to be overlapped to each other, and thereafter, the Fourier transform is conducted for each small image domain in accordance with the equation (1). The obtained result of the local Fourier transform is supplied to the same image predicting unit 6.

This same image predicting unit 6 utilizes the power spectrum pattern for the reference image and each local parallax between the left eye image and the right eye image for the reference image, which are stored in the memory 5, and predicts a difference in the parallax and in the power spectrum pattern, between the reference image and an image to be extracted within the input image, and calculates a local Fourier transform image for the image to be extracted within the input image.

The local Fourier transform image $F_L'(k,X)$ and $F_R'(k,X)$ for the image to be extracted within the input image, outputted from same image predicting unit 6, is given when the energy functions $E_L$ and $E_R$ expressed by the following equations are minimum:

$$E_L = \sum_{\delta\phi} \left[|F_L'(k, X)\exp[ik\Delta^L(X)] + F_R(k, X)\exp[i(\delta\phi - \theta)]\exp[ik\Delta^R(X)]|^2 - \lambda_L P_B(k, X, \delta\phi)\right]^2 \qquad (7a)$$

$$E_R = \sum_{\delta\phi} \left[|F_L(k, X)\exp[ik\Delta^L(X)] + F_R'(k, X)\exp[i(\delta\phi - \theta)]\exp[ik\Delta^R(X)]|^2 - \lambda_R P_B(k, X, \delta\phi)\right]^2 \qquad (7b)$$

where $F_L(k,X)$ and $F_R(k,X)$ are a local Fourier transform image of the left eye image and the right eye image of the input image, respectively, and $P_B(k,X,\delta\phi)$ is the power spectrum pattern of the reference image.

In addition, "$\theta$" is a fitting parameter for compensating a positional difference in a depth direction between the reference image and the image to be extracted within the input image, and $\lambda_L$ and $\lambda_R$ are fitting parameters for compensating a difference in strength between the reference image and the image to be extracted within the input image.

Furthermore, $\Delta^L(X)$ and $\Delta^R(X)$ in the equations (7a) and (7b) are fitting parameters which meet the constraint condition expressed by the following equation (8), under the condition that the parallax in each local image domain of the reference image is $\Delta(X)$.

$$|\Delta^L(X)| + |\Delta^R(X)| = |\Delta(X)| \text{ and } \Delta^L(X)\Delta^R(X) \le 0 \qquad (8)$$

in the case that $|\Delta^L(X)| \le |\Delta(X)|$ and $|\Delta^R(X)| \le |\Delta(X)|$ $|\Delta^L(X) - |^R(X)| = |\Delta(X)|$ in the other cases The local Fourier transform images $F_L'(k,X)$ and $F_R'(k,X)$, outputted from the same image predicting unit 6, for the image to be extracted within the input image, are outputted to the local inverse Fourier transform calculating unit 7. This local inverse Fourier transform calculating unit 7 conducts the inverse local Fourier transform expressed by the following equation (9), for the inputted local Fourier transform images $F_L'(k,X)$ and $F_R'(k,X)$, so as to calculate the left eye image $\hat{f}_L(x)$ and the right eye image $\hat{f}_R(x)$ of the local inverse Fourier transform, which are outputted to the geometric average calculating unit $$\hat{f}_\mu(x) = \frac{\frac{1}{N^2}\sum_X \sum_k F'_\mu(k, X)\exp[ik(x - X)]}{\sum_x G_\sigma(x - X)} \qquad (9)$$

$\mu = L$ or $R$

In the equation (9), "N" is a standardizing constant.

The geometric average calculating unit 8 calculates a geometric average of the left eye image $\hat{f}_L(x)$ and the right eye image $\hat{f}_R(x)$ of the local inverse Fourier transform, outputted from the local inverse Fourier transform calculating unit 7, and the input left eye image $f_L(x)$ and the respectively, and outputs the obtained results $f_L^{new}(x)$ and $f_R^{new}(x)$ to the image output unit 9.

In this embodiment, focus attention to the fitting parameters $\Delta^L(X)$ and $\Delta^R(X)$, calculated in the same image predicting unit 6, and obtained in the case that the difference in the sighting angle between the reference image and the image to be extracted within the input image is compensated. FIG. 2B shows an image reconstructed conveniently as a two-dimensional projected image when $\Delta^L(X)=3\Delta/4$ and $\Delta^R(X)=\Delta/4$, and FIG. 2B shows an image reconstructed conveniently as a two-dimensional projected image when $\Delta^L(X)=\Delta$ and $\Delta^R(X)=0$. FIG. 2C shows an image reconstructed conveniently as a two-dimensional projected image when $\Delta^L(X)=2\Delta$ and $\Delta^R(X)=\Delta$.

As mentioned above, since the image is viewed with changes in depth depending upon the value of the fitting parameters, it could be understood that it is possible to predict the image which is viewed differently because of the change in depth, by use of the fitting parameters. Thus, the first embodiment of the present invention can extract or segment the three-dimensional image to be segmented, even if it is viewed differently from the reference image because of the change in depth, with using no two-dimensional projected image of the three-dimensional image.

Second Embodiment

Figure 4:
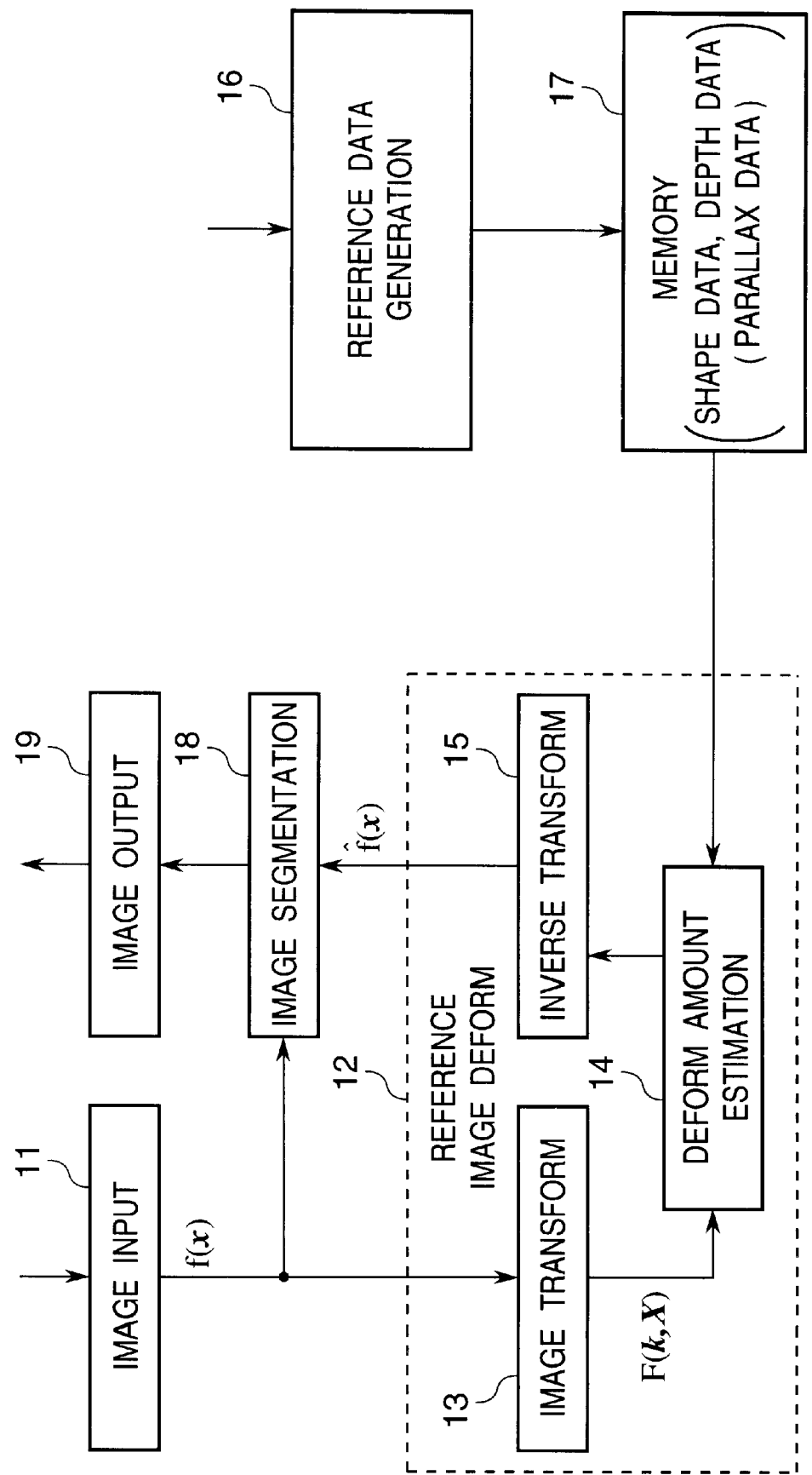
FIG. 4 is a block diagram of a second embodiment of the three-dimensional reference image segmenting device in accordance with the present invention.

Referring to FIG. 4, there is shown a block diagram of a second embodiment of the three-dimensional reference image segmenting device in accordance with the present invention.

The shown three-dimensional reference image segmenting device includes an image input unit 11, a reference image deform unit 12, a reference data generating unit 16, a memory 17, an image segmentation unit 18 and an image output unit 19, which are connected as shown. The reference image deform unit 12 includes an image transform unit 13, a deform amount estimating unit 14 and an inverse transform unit 15, which are connected as shown.

Figure 5:
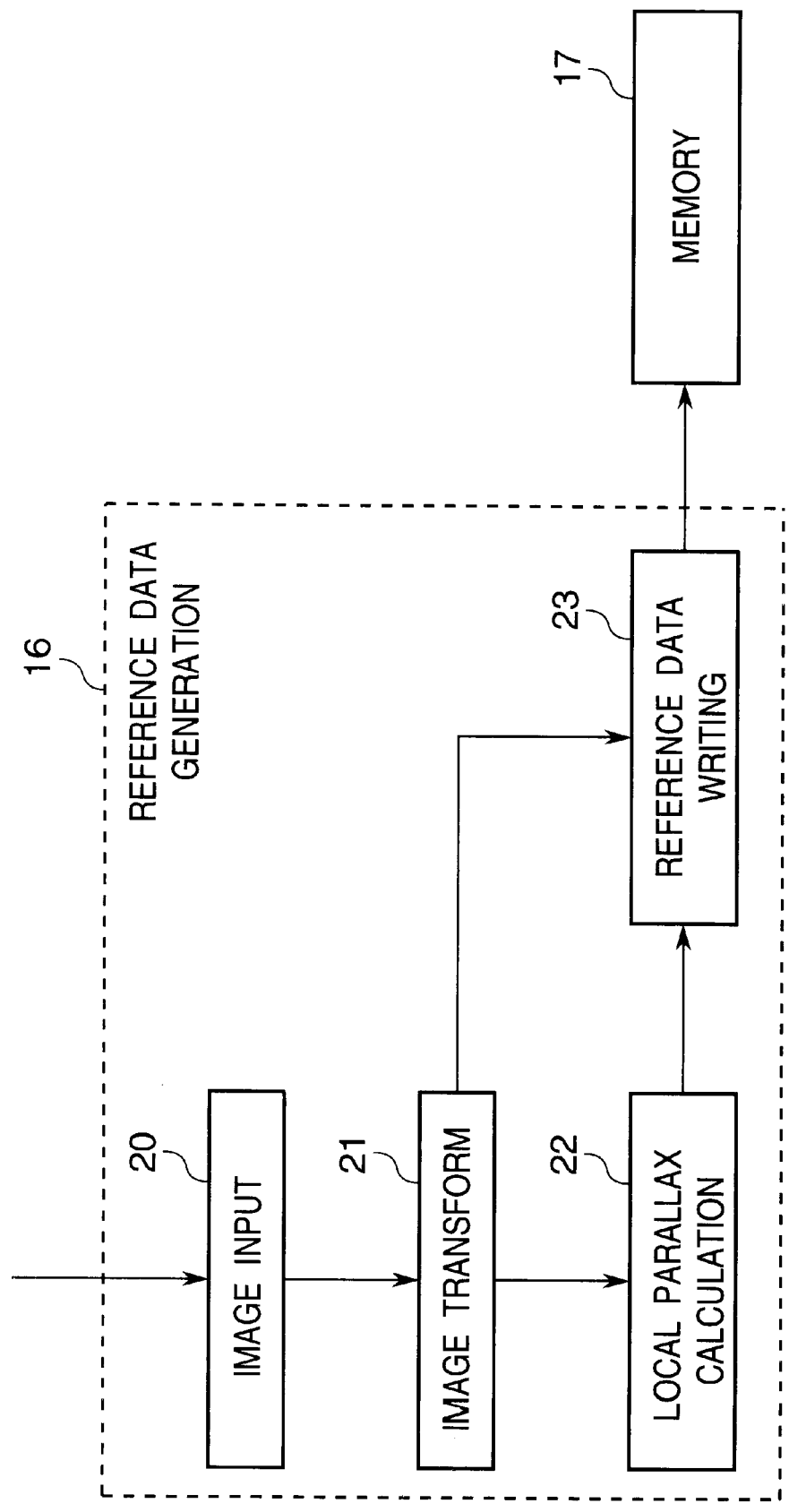
FIG. 5 is a block diagram of the reference data generating unit shown in FIG. 4.

Furthermore, the reference data generating unit 16 includes, as shown in FIG. 5, an image input unit 20, an image transform unit 21, a local parallax calculating unit 22 and a reference data writing unit 23, which are connected as shown. Here, the image input unit 20 can be made in common to the image input unit 11 shown in FIG. 4, and the image transform unit 21 can be made in common to the image transform unit 13 shown in FIG. 4.

Next, operation of the second embodiment will be described. First, a method for generating a reference image data will be described.

Left and right images respectively corresponding to a left eye view and a right eye view obtained by looking a reference image to be segmented, by a left eye and a right eye, respectively, are sequentially inputted through the image input unit 20 to the image transform unit 21 of the reference data generating unit 16. In the image transform unit 21, each of the left eye view and the right eye view inputted is divided into small image domains permitted to be overlapped to each other, and thereafter, the Fourier transform is conducted for each small image domain (local Fourier transform). This local Fourier transform is one expressed by the equation (1), similarly to the first embodiment.

Of the left eye image $F_L(k,X)$ and the right eye image $F_R(k,X)$ of the local Fourier transform thus obtained, the image transform unit 21 outputs only a predetermined one, as a shape data $F_{ref}(k,X)$, through the reference data writing unit 23 to the memory 17 so as to cause the memory 17 to store the shape data $F_{ref}(k,X)$.

The local parallax calculating unit 22 receives the left eye image $F_L(k,X)$ and the right eye image $F_R(k,X)$ of the local Fourier transform, outputted from the image transform unit 21, and calculates the parallax $\Delta(X)$ between the left eye image and the right eye image of the local Fourier transform, for each small or local image domain.

This parallax can be calculated by using the equations (4) to (6), similarly to the first embodiment, but is calculated in the second embodiment in accordance with the following equations:

$$\left. \begin{array}{l} \Delta(X) = \arg_\Delta[\text{Max}Z'(X, \Delta)] \\ \\ Z'(X, \Delta) = \sum_k [F_R(k, X)F_L^*(k, X)]\exp[ik\Delta] \end{array} \right\} \quad (10)$$

where $F_L^*$ is a conjugate complex number of $F_L$.

Here, this equation (10) is explained. As seen from the equation (1), since $F_R(K,X)$ and $F_L(k,X)$ are the Fourjier transform of the right eye local image $f_R(x)G_o(x-X)$ and the left eye local image $f_L(x)G_o(x-X)$, $Z'(X,\Delta)$ becomes equal to an interdependent correlation function between the right eye local image and the left eye local image in each local image domain X. Accordingly, when one of the right eye local image and the left eye local image is shifted to maximize the interdependent correlation function between the right eye local image and the left eye local image in each local image domain, the magnitude of the shift (local parallax) $\Delta(X)$ which maximizes the overlapping of the local images, can be obtained.

The approach of calculating the local parallax in accordance with the equation (10) can reduce the amount of calculation, in comparison with the approach for directly obtaining the interdependent correlation function so as to calculate the local parallax. Therefore, a high speed processing becomes possible.

In this second embodiment, the degree of reliability $w(X)$ to the local parallax calculated by the local parallax calculating unit 22, can be calculated from the following equation:

$$w(X) = \frac{Z'(X, \Delta(X))}{\sqrt{\sum_k |F_R(k, X)|^2 \sum_k |F_L(k, X)|^2}} \quad (11)$$

Incidentally, from the viewpoint of balancing the amount of calculation, the calculation of the degree of reliability can be omitted.

A horizontal component (x component) of the parallax for each local image domain calculated in accordance with the equation (10) and the degree of reliability calculated in accordance with the equation (11), in the local parallax calculating unit 22, are supplied through the reference data writing unit 23 to the memory 17 and recorded as a depth data in the memory 17.

Next, a method for extracting or segmenting from an input image an image of the same object as that of the reference data, will be described.

In this second embodiment, the input image is not a pair of stereo images corresponding to a left eye image and a right eye image, but one image, which is inputted through the image input unit 11 to the reference image deform unit 12. This reference image deform unit 12 compares the received input image with the reference data (shape data and depth data (parallax data) read out from the memory 17, and generates the reference image deformed to accord with the input image to a possible extent Here, the deforming processing of this reference image deforming unit 12 will be described in detail. First, the image transform unit 13 shown in FIG. 4 executes a local Fourier transform expressed by the following equation:

$$\left. \begin{array}{l} F(k, X) = \sum_x f(x)G_\sigma(x-X)\exp[-ik(x-X)] \\ \\ G_\sigma(x-X) = \exp\left[-\frac{1}{2\sigma^2}\{(x-X)^2 + (y-Y)^2\}\right] \\ \\ (x, y) = x, (X, Y) = X \end{array} \right\} \quad (12)$$

where f(x) is one input image.

The deform amount estimating unit 14 receives the local Fourier transform image $F(k,X)$ of the input image, outputted from the image transform unit 13, and the reference data concerning the reference image, read out from the memory 17, and calculates the amount of deform required to make both the images coincident with each other. Here, since the deform of the reference image is realized by displacing the local image in each local image domain, the deform amount estimating unit 14 calculates the displacement vector $\Delta_2(X)$ of the reference image required for the displacement. For this purposed, a first estimated value $\Delta_1(X)$ is calculated in accordance with the following equation (13), and simultaneously, the degree of reliability $w_1(X)$ of the estimated value is calculated in accordance with the following equation (14).

$$\left. \begin{array}{l} \Delta_1(X) = \arg_\Delta[\text{Max}Z''(X, \Delta)] \\ \\ Z''(X, \Delta) = \sum_k [F(k, X)F_{ref}^*(k, X)]\exp[ik\Delta] \end{array} \right\} \quad (13)$$

$$w_1(X) = \frac{Z''(X, \Delta_1(X))}{\sqrt{\sum_k |F_{ref}(k, X)|^2 \sum_k |F(x, X)|^2}} \quad (14)$$

Incidentally, the calculation of the degree of reliability $w_1(X)$ in accordance with the following equation (14) can be omitted from the viewpoint of balancing the amount of calculation, In accordance with the following equation (13), and for each local image domain, there is calculated the amount of displacement required to match the input image with the reference image to a maximum extent. However, since this processing is conducted for each local image domain, there is possibility that in some domains an erroneous estimated value is obtained because of influence of the background.

In addition, in the case that this segmenting method is used as a portion of an object discrimination system, it is more preferable not to erroneously extract or segment an object included in an input image when the object is different from an object stored as a reference image. However, if the amount of deform is estimated on the basis of only the equation (13) and a succeeding segmenting processing is executed, there is possibility of extracting or segmenting an object which is different from but similar to the reference object. The reason for this is that, since the reference image is permitted to be displaced to become coincident with the input image to a maximum extent. for each local image domain, independently from the coincidence over the whole of the image, the degree of freedom in the deform permitted to the reference image is too large.

On the other hand, the change in the object image caused by looking the object from a different viewing angle, is constrained to a limited extent. Therefore, this second embodiment is so configured that, the reference image is deformed to permit only a deform (displacement of the reference image in each local image domain) expressed by the following equation (15), by using the depth data $\Delta x(X)$ of the reference object (the horizontal direction component of the parallax for each local image domain calculated in accordance with the equation (10)) stored in the memory 17, and the amount of deform for making the reference image coincident with the input image to a maximum extent in this limited deform, is estimated $$\left.\begin{aligned}\Delta_2(X) &= (DX_2(X), DY_2(X)) \\ DX_2(X) &= a\Delta_x(X) + b + c(X - X_0) - d(Y - Y_0) \\ DY_2(X) &= a'\Delta_x(X) + b' + c(Y - Y_0) - d(X - X_0)\end{aligned}\right\} \quad (15)$$

In the above equation (15), "a" is a rotational angle in a depth direction around a y-axis, and "a'" is a rotational angle in a depth direction around an x-axis, but may be a parameter in proportion to the rotational angle when the rotational angle is not so large.

The equation (15) allows the change of the image caused by not only the rotation in the depth direction. but also a parallel displacement, an enlargement and reduction in scale, and an in-plane rotation. In the equation (15), "b" is the amount of parallel displacement in an x-axis direction, and "b'" is the amount of parallel displacement in a y-axis direction. "c" is an enlargement ratio considering a point $(X_0, Y_0)$ as a center, and "d" is an in-plane rotational angle considering a point $(X_0, Y_0)$ as a center, but may be a parameter in proportion to the in-plane rotational angle when the in-plane rotational angle is not so large. Here, the coordinate $(X_0, Y_0)$ is placed on a center position in the image.

The values of these parameters are determined to minimize an error between $\Delta_2(X)=(DX_2(X), DY_2(X))$ and the displacement vector $\Delta_1$ for each local image domain firstly estimated. In this second embodiment, the error E is defined by the following equation (16), and the values of the respective parameters are determined to minimize the error E, so as to estimate the displacement vector $(DX_2, DY_2)$ for each local image domain.

$$E = \sum_x \left[\left\{\frac{\Delta_1(X)}{|\Delta_1(X)|} \cdot (\Delta_2(X) - \Delta_1(X))\right\}^2 + \lambda |\Delta_2(X) - \Delta_1(X)|^2\right] w(X) w_1(X) \quad (16)$$

In the equation (16), the second item of the right side indicates a conventional square error weighted with the degree of reliability. The first item of the right side indicates a square of a component in parallel to $\Delta_1$, of the error vector. This first item is introduced by taking the following situation into consideration. For example, when a line segment is included in a certain local image domain, it only the local image domain is examined, it is difficult to precisely determine a positional difference or deviation of the line segment between the input image and the reference image in a direction in parallel to the line segment In the equation (16), $\lambda$ is a constant for determining the relative weight between the first item and the second item of the right side.

Furthermore, since the error E given by the equation (16) is a quadratic function concerning the parameters "a", "a'", "b", "b'", "c" and "d", a processing for minimizing the error E can be easily executed by means of a conventional "method of least squares". Namely, the error E is partially differentiated by each parameter, and a system of linear equations obtained by put the result of the partial derivative equal to 0 (zero) is solved. Thus, the solution can be obtained quickly with no necessity of a repeated operation.

The inverse transform unit 15 receives the displacement vector $\Delta_2(X)$ obtained in the deform amount estimating unit 14 and the data $F_{ref}(k,X)$ of the local Fourier transform image of the reference image supplied through the deform amount estimating unit 14 from the memory 17, and generates the deformed reference image by an inverse Fourier transform expressed by the following equation (17):

$$\left.\begin{aligned}\hat{f}(x) &= \frac{\frac{1}{N^2}\sum_{X,k} F'(k, X)\exp[ik(x-X)]}{\sum_x G_\sigma(x-X)} \\ F'(k, X) &= F_{ref}(k, X)\exp[ik\Delta_2(X)]\end{aligned}\right\} \quad (17)$$

Incidentally, in order to elevate the degree of precision of the reverence image calculated and deformed in accordance with the equation (17), the processing& from the equation (13) to the equation (17) may be repeated two or three times if necessary. In this case, the reference image obtained in accordance with the equation (17) is supplied to the image deform unit 13, in which a local Fourier transform image data $F_{ref2}(k,X)$ is calculated. The processings from the equation (13) to the equation (17) is repeated by regarding $F_{ref2}(k,X)$ as the local Fourier transform image data $F_{ref}(k,X)$ of a new reference image.

The image segmentation unit 18 shown in FIG. 4 calculates a geometric average of the deformed reference image data $\hat{f}(x)$ and the input image f(x) to extract or segment a reference object imaae from within the input image and to output the segmentation result through the image output unit 19.

Third Embodiment

Figure 6:
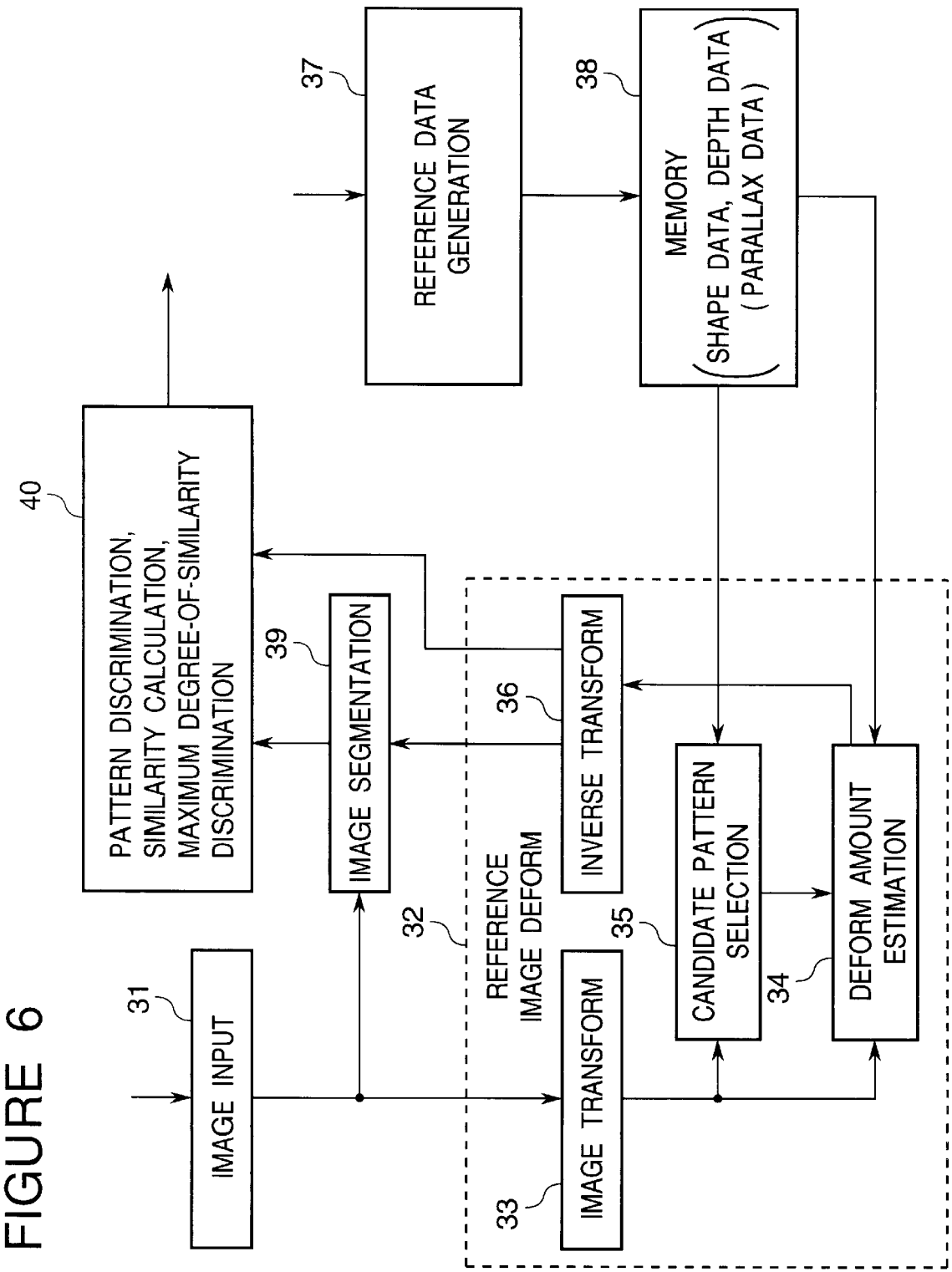
FIG. 6 is a block diagram of an embodiment of the object discrimination system in accordance with the present invention.

Referring to FIG. 6, there is shown a block diagram of an embodiment of the object discrimination system in accordance with the present invention. This embodiment is called a third embodiment in this specification. The shown object discrimination system includes an image input unit 31, a reference image deform unit 32, a reference data generating unit 37, a memory 38, an image segmentation unit 39, and a pattern discrimination unit 40, which are connected as shown. The reference image deform unit 32 includes an image transform unit 33, a deform amount estimating unit 34, a candidate pattern selection unit 35 and an inverse transform unit 36, which are connected as shown.

Next, operation of this embodiment will be described. The reference data generating unit 37 operates substantially similarly to the reference data generating unit 16 shown in FIG. 5 in the second embodiment, but different from the reference data generating unit 16 in the following points. The reference data generating unit 37 generates a reference image data for each of a plurality of reference objects to be discriminated, and to supplies each reference image data to the memory 38 so as to cause the memory 38 to store each reference image data. In addition, the reference data generating unit 37 is configured to first execute a convolution integration based on a DoG function expressed by the following equation (18), for the input left eye image and right eye image, and to output the result $f_R'(x)$ and $f_L'(x)$ to the image transform unit 21 so as to cause it to execute its processing regarding the received result as the input image.

$$\left. \begin{array}{l} f_\mu'(x) = \sum_{x'} f_\mu(x') DoG(x' - x) \\ \\ DoG(x) = G_{\sigma 1}(x) - G_{\sigma 2}(x), \mu = L \text{ or } R \end{array} \right\} \quad (18)$$

In the above equation (18), $G\sigma 1$ and $G\sigma 2$ are Gauss function, and the standard deviation $\sigma_1$ and $\sigma_2$ are determined to meet with a relation of $\sigma_1 < \sigma_2$. Here, it is determined that $\sigma_1 = 0.5$ pixel and $\sigma_2 = 2$ pixels.

Next, a method for discriminating, on the basis of the input image, an object photographed in input the image will be described. First, an input image is supplied to the image input unit 31 in FIG. 6. In this embodiment, for the input image f(x), the image input unit 31 executes the convolution integration based on the DoG function similar to the equation (18), so as to enhance a portion where the brightness changes abruptly in the input image. In the following process, all processings are conducted for the image thus processed, namely, for the brightness-change enhanced image, and therefore, this brightness-change enhanced image will be called newly an "input image" hereinafter.

The input imaae outputted from the image input unit 31 is supplied to the reference image deforming unit 32. In reference image deforming unit 32, the image deforming unit 33 executes the local Fourier transform in accordance wit the equation (12) for the input image, and outputs the obtained local Fourier transform image data F(k,X) to the deform amount estimation unit 34 and the candidate pattern selection unit 35.

The candidate pattern selection unit 35 executes a pattern matching processing between the local Fourier transform image data F(k,X) and the local Fourier transform image data Fi(kX) of the reference image read out from the memory 38, and selects a plurality of candidate patterns In this processing, the degree of similarity $S_i$ between the local Fourier transform image data of each reference image and the local Fourier transform image data of the input image, is calculated in accordance with the following equation (19):

$$S_i' = \frac{\sum_{k,X} |F(k,X)||Fi(k,X)|}{\sqrt{\sum_{k,X} |F(k,X)|^2 \sum_{k,X} |Fi(k,X)|^2}} \quad (19)$$

As well known, since the amplitude of the Fourier transform image is invariable to a positional deviation of the original local image domain, the equation (19) makes it possible to realize the pattern matching processing permitting a local positional deviation. Reference patterns of a predetermined number counted from the highest one in the degree of similarity $S_i'$ are selected as the candidate patterns, or alternatively, reference patterns having the degree of similarity $S_i'$ larger than a predetermined value, are selected as the candidate patterns.

The reference image data (shape data and depth data) of the candidate patterns thus selected is read out from the memory 38, and completely similarly to the second embodiment, the deform amount estimation unit 34 calculates, on the basis of the reference image data and the local Fourier transform data of the input image supplied from the image transform unit 33, the amount of deform required to make each reference image coincident with the input image to a possible extent.

Furthermore, the inverse deform unit 36 generates the reference image deformed in accordance with the equation (17). Thus, the deformed reference images are supplied to the image segmentation unit 39 and the pattern discriminating unit 40.

The pattern discriminating unit 40 calculates the degree of similarity between the deformed reference image as mentioned above and the object image extracted from the input image by the image segmentation unit 39, which executes a processing similar to that of the image segmentation unit 18 of the second embodiment. Here, since the background has been removed in the extracted image outputted from the image segmentation unit 39, and since the reference image outputted from the reference image deform unit 32 is deformed to become coincident with the input image to a possible extent under the constraint condition expressed by the following equation (15), it is unnecessary, in the course of calculating the degree of similarity, to pay attention to the background and deform which had to be considered conventionally. In this embodiment, the pattern discriminating unit 40 calculates a degree of final similarity $S_i$ in accordance with the following equation (20) and considering the extracted image as $f_0$.

$$S_i = \frac{\sum_x \hat{f}(x) f_0(x)}{\sqrt{\sum_x \hat{f}^2(x) \sum_x f_0^2(x)}} \quad (20)$$

The deform amount estimating unit 34, the inverse deform unit 36, the image segmentation unit 39 and the pattern discriminating unit 40 sequentially execute the above mentioned respective processings for all the selected candidate patterns, so as to obtain the degree of similarity for each of the selected candidate patterns. Finally, the pattern discriminating unit 40 selects a maximum degree of similarity from the degrees of similarity thus obtained, and if the selected maximum degree of similarity exceeds a predetermined threshold value, the pattern discriminating unit 40 outputs the maximum degree of similarity or the reference image of the maximum degree of similarity, as the discrimination result.

Figure 7A:
FIGS. 7A to 7F are images and a graph for illustrating an operation example of the third embodiment shown in FIG. 6.
Figure 7B:
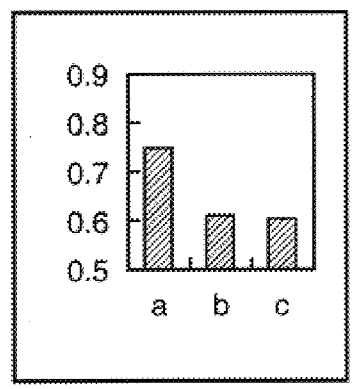

Referring to FIGS. 7A to 7F, there are shown images and a graph for illustrating an operation example of the third embodiment shown in FIG. 6. FIG. 7A shows an example of the input image, and FIG. 7B is a graph showing the degree of similarity in the case that three candidate patterns "a""b" and "c" are selected and compared with the input image shown in FIG. 7A. In addition, the graph of FIG. 7B illustrates that the candidate pattern "a" has the highest degree of final similarity, and the candidate patterns "b" and "c" have the degree of final similarity lower than that of the candidate pattern "a". As the shape data of the candidate patterns "a" and "b", local Fourier transform image data obtained by filter-processing the reference images shown in FIGS. 7C and 7E on the basis of the DoG function, respectively, is stored in the memory 38.

Figure 7C:
Figure 7D:
Figure 7E:
Figure 7F:

FIG. 7D shows the result obtained by executing the reference image segmentation to the candidate pattern "a" shown in FIG. 7C, and FIG. 7F shows the result obtained by executing the reference image segmentation to the candidate pattern "b" shown in FIG. 7E. It would be notice from comparison between FIGS. 7A and 7D that, the face shown in the input image is rotated in comparison with the reference image of the candidate pattern "a". Nevertheless, a preferable segmentation processing was executed. To the contrary, when the candidate pattern "b" shown in FIG. 7E different from the input image shown in FIG. 7A is used as the reference image, the segmentation was not normally or preferably executed as shown in FIG. 7F.

Thus, as shown in the data of the degree of final similarity shown in FIG. 7B, this embodiment can realize a proper or correct discriminating processing even if a correct candidate pattern has the maximum degree of final similarity but contains the background and the face which is slightly rotated.

In the case that the rotational angle is so considerably large that a portion which was seen in the reference image is concealed and to the contrary, another portion which was concealed in the reference image becomes visible, it is a matter of course that the recognition precision of the object discrimination system of the present invention drops. In order to avoid this disadvantage, a plurality of reference object images obtained by photographing a reference object from a plurality of different viewing angles, are preferably prepared and stored in the memory.

Thus, the object discrimination system of the present invention uses the depth data of the reference object and executes the segmentation after the reference image is deformed using the depth data as the constraint condition. Therefore, it is possible to avoid an object which is similarly to but precisely different from a reference object, from being erroneously discriminated as the same as the reference object, which would otherwise have occurred because of an unlimited deform. Accordingly, a correct object discrimination can be realized even if a background exits or even if the image of an object to be discriminated is deformed because of a rotation in a depth direction, parallel displacement, enlargement or reduction in scale, and/or an in-plane rotation.

The invention has thus been shown and described with reference to the specific embodiments, however, it should be noted that the present invention is in no way limited to the details of the illustrated structures but changes and modifications may be made within the scope of the appended claims.

For example, in the above mentioned embodiments, the shape data generated in the reference data generating units 16 and 37 is the data of the image calculated by local-Fourier-transforming a selected one of a pair of left eye image and right eye image inputted. However, the shape data may be a selected one itself of a pair of left eye image and right eye image inputted, or alternatively, the data of the image calculated execute any transform other than the Fourier transform for the selected input image.

As seen from the above, even if a reference image and an image to be extracted within an input image are different in power spectrum pattern because the parallax between a left eye image and a right eye image is different between the reference image and the image to be segmented, the present invention can extract or segment only the three-dimensional image to be segmented, by judging that both are substantially the same one the basis of a prediction under a certain constraint condition.

Furthermore, since the present invention directly handle the three-dimensional image image without using a two-dimensional projected image of the three-dimensional image, the present invention can efficiently extract or segment from the input image a three-dimensional image similar to the reference image, even if the image scale is very large.

In addition, the present invention is characterized in that the segmentation is executed after the reference image is deformed by using the depth data of the reference image as the constraint condition. Therefore, it is possible to avoid an object which is similarly to but precisely different from a reference object, from being erroneously discriminated as the same as the reference object, which would otherwise have occurred because of an unlimited deform.

Moreover, the present invention can elevate reliability of the object discrimination in comparison with the prior art object discrimination because a correct object discrimination can be realized even if a background exits or even if the image of an object to be discriminated is deformed because of a rotation in a depth direction, parallel displacement, enlargement or reduction in scale, and/or an in-plane rotation.

We claim:

1. A three-dimensional reference image segmenting method comprising the steps of:

dividing each of left and right images respectively corresponding to a left eye view and a right eye view obtained by looking a reference image to be segmented, by a left eye and a right eye, respectively, into small image domains permitted to be overlapped to each other;

executing a Fourier transform for each of said small image domains to calculate a local Fourier transform image data;

calculating and storing a power spectrum pattern from a sum, including a phase difference, of said local Fourier transform image data of said left and right images;

calculating and storing on the basis of said power spectrum pattern a parallax between said left and right images for each of said small image domains;

dividing one of left and right images respectively corresponding to a left eye view and a right eye view obtained by looking an input image containing said reference image, by a left eye and a right eye, respectively, into small image domains permitted to be overlapped to each other;

executing a Fourier transform for each of said small image domains of said input image to calculate a local Fourier transform image data;

estimating a difference in paralax and in power spectrum pattern between said reference image and an image to be extracted within said input image, by using as a constraint condition the parallax between said left and right images of said reference image for each local image domain, on the basis of said local Fourier transform image data of said input image, said power spectrum pattern stored of said reference image and said parallax stored between said left and right images of said reference image for each local image domain; and on the basis of the result of the above estimation, extracting from said input image only an image having a power spectrum pattern similar to that of said reference image.

2. A three-dimensional reference image segmenting device comprising:

an image input means receiving left and right images respectively corresponding to a left eye view and a right eye view obtained by looking a reference image to be segmented, by a left eye and a right eye, and also receiving one of left and right images respectively corresponding to a left eye view and a right eye view obtained by looking an input image containing said reference image, by a left eye and a right eye, respectively;

a local Fourier transform means receiving said left and right images from said image input means, for dividing each of said left and right images into small image domains permitted to be overlapped to each other, and executing a Fourier transform for each of said small image domains to calculate a local Fourier transform image data;

a power spectrum pattern calculating means for calculating a power spectrum pattern from a sum, including a phase difference, of said local Fourier transform image data of said left and right images of said reference image outputted from said local Fourier transform means;

a local parallax calculating means for calculating, on the basis of said power spectrum pattern outputted from said power spectrum pattern calculating means, a parallax between said left and right images of said reference image for each of said small image domains;

a memory means receiving and storing said power spectrum pattern outputted from said power spectrum pattern calculating means and said parallax for each of said small image domains outputted from said local parallax calculating means;

a same image predicting means receiving, when said input image containing said reference image is inputted to said image input means, said local Fourier transform image data of said input image, outputted from said local Fourier transform means, and said power spectrum pattern of said reference image and said parallax between said left and right images of said reference image for each of said small image domains, outputted from said memory means, said same image predicting means estimating a difference in parallax and in power spectrum pattern between said reference image and an image to be extracted within said input image, by using as a constraint condition the parallax between said left and right images of said reference image for each local image domain, and calculating a local Fourier transform image of said image to be extracted within said input image;

a local inverse Fourier transform means receiving from said same image predicting means said local Fourier transform image of said image to be extracted within said input image, for executing a local inverse Fourier transform to the received local Fourier transform image of said image to be segmented, to output data of left and right images of aid image to be segmented; and an average calculating and outputting means for calculating and outputting a geometric average between said data of left and right images outputted from said local inverse Fourier transform means and data of said input image containing said reference image outputted from said image input means.

3. A three-dimensional reference image segmenting device claimed in claim 2 wherein said same image predicting means calculates the local Fourier transform images $F_L'(k,X)$ and $F_R'(k,X)$ for the image to be extracted within the input image, and which minimize the energy functions $E_L$ and $E_R$ expressed by the following equations:

$$E_L = \sum_{\delta\phi} \left[|F_L'(k, X)\exp[ik\Delta^L(X)] + F_R(k, X)\exp[i(\delta\phi - \theta)\exp[ik\Delta^R(X)]|^2 - \lambda_L P_B(k, X, \delta\phi)\right]^2$$

$$E_R = \sum_{\delta\phi} \left[|F_L(k, X)\exp[ik\Delta^L(X)] + F_R'(k, X)\exp[i(\delta\phi - \theta)\exp[ik\Delta^R(X)]|^2 - \lambda_R P_B(k, X, \delta\phi)\right]^2$$

where $F_L(k,X)$ and $F_R(k,X)$ are a local Fourier transform image of said left image and said eye image of said input image, respectively, $P_B(k,X,\delta\Phi)$ is the power spectrum pattern of said reference image, $\Delta^L(X)$ and $\Delta^R(X)$ are a parallax for each local image domain between said left image and said eye image of said reference image, "$\theta$" is a fitting parameter for compensating a positional difference in a depth direction between said reference image and said image to be extracted within said input image, $\lambda_L$ and $\lambda_R$ are fitting parameters for compensating a difference in strength between said reference image and said image to be extracted within said input image, under the following constraint condition:

$|\Delta^L(X)| + |\Delta^R(X)| = |\Delta(X)|$ and $\Delta^L(X)\Delta^R(X) \leq 0$ in the case that $|\Delta^L(X)| \leq |\Delta(X)|$ and $|\Delta^R(X)| \leq |\Delta(X)|$ $|\Delta^L(X) - |^R(X)| = |\Delta(X)|$ in the other cases.

4. A three-dimensional reference image segmenting device comprising:

a reference data generating means receiving left and right images respectively corresponding to a left eye view and a right eye view obtained by looking a reference object to be segmented, by a left eye and a right eye, and also dividing each of said left and right images into small image domains permitted to be overlapped to each other, and calculating a depth data of said reference object on the basis of parallax between said left and right images for each of said small image domains, said reference data generating means also generating a shape data concerning a predetermined one image of said received left and right images;

a memory means receiving and storing said depth data and shape data generated by said reference data generating means;

an image input means receiving an input image to be processed;

a reference image deform means receiving said input image supplied from said memory means, and said shape data read out from said memory, and for deforming the reference image to make the reference image coincident with said input image to a possible maximum extent using as a constraint condition said depth data read out from said memory;

an image segmentation means receiving said deformed reference image outputted from said reference image deform means and said input image supplied from said image input means, for segmenting said input image with reference with said deformed reference image; and an image output means for outputting the result of the segmentation obtained in said image segmentation means.

5. A three-dimension reference image segmenting device claimed in claim 4 wherein said reference data generating means generates, as said shape data, data of said predetermined one image of said received left and right images, or data obtained by executing a transform processing to said predetermined one image of said received left and right images.

6. A three-dimensional reference image segmenting device claimed in claim 4 wherein said reference data generating means comprises:

an image transform means for executing a Fourier transform to said input image supplied from said image input means, for each of said small image domains, to calculate a local Fourier transform image;

a deform amount estimating means receiving said local Fourier transform image supplied from said image transform means and said shape data read out from said memory, for examining, for each of said small image domains, by what amount of displacement of said reference image and to what extent said reference image coincides with said input image, and for calculating and selecting, as a temporary displacement vector, for each of said small image domains, a displacement vector which makes said reference image coincident with said input image to a maximum extent, from displacement vectors, for each small image domain, generated when said reference object is rotated or displaced, by using as a constraint condition said depth data road out from said memory; and an inverse transform means receiving said displacement vector for each small image domain outputted from said deform amount estimating means and said shape data read out from said memory, for executing said shape data with reference with said displacement vector, so as to generating said deformed reference image.

7. A three-dimensional reference image segmenting device claimed in claim 6 wherein said reference data generating means comprises:

a reference data generating image input means receiving left and right images respectively corresponding to a left eye view and a right eye view obtained by looking said reference objected to be segmented, by a left eye and a right eye, respectively;

a reference data generating image transform means for dividing each of said left and right images supplied from said reference data generating image input means, into small image domains permitted to be overlapped to each other, and executing a Fourier transform for each of said small image domains to calculate a local Fourier transform image data;

a local parallax calculating means for calculating, on the basis of said local Fourier transform image data for each of said left and right images, outputted from said reference data generating image transform means, a parallax between said left and right images of said reference image for each of said small image domains, which maximizes an interdependent correlation function between between said left and right images; and a reference data writing means for writing, as said shape data into said memory, the local Fourier transform image data of one image, selected from said local Fourier transform image data of said left and right images calculated by said reference data generating image transform means, said reference data writing means writing, as said depth data into said memory, said parallax calculated in said local parallax calculating means.

8. A three-dimensional reference image segmenting device claimed in claim 4 wherein said reference data generating means comprises:

a reference data generating image input means receiving left and right images respectively corresponding to a left eye view and a right eye view obtained by looking said reference objected to be segmented, by a left eye and a right eye, respectively;

a reference data generating image transform means for dividing each of said left and right images supplied from said reference data generating image input means, into small image domains permitted to be overlapped to each other, and executing a Fourier transform for each of said small image domains to calculate a local Fourier transform image data;

a local parallax calculating means for calculating, on the basis of said local Fourier transform image data for each of said left and right images, outputted from said reference data generating image transform means, a parallax between said left and right images of said reference image for each of said small image domains, which maximizes an interdependent correlation function between between said left and right images; and a reference data writing means for writing, as said shape data into said memory, the local Fourier transform image data of one image, selected from said local Fourier transform image data of said left and right images calculated by said reference data generating image transform means, said reference data writing means writing, as said depth data into said memory, said parallax calculated in said local parallax calculating means.

9. An object discrimination system comprising: a reference data generating means receiving a plurality of pairs of left and right images each pair respectively corresponding to a left eye view and a right eye view obtained by looking each of a plurality of reference objects to be discriminated, by a left eye and a right eye, and also dividing each of said left and right images into small image domains permitted to be overlapped to each other, and calculating a depth data of each of said reference objects on the basis of parallax between said left and right images for each of said small image domains, said reference data generating means also generating a shape data of each of said reference objects on the basis of a predetermined one image of each pair of left and right images of said received plurality of pairs of left and right images;

a memory means receiving and storing said depth data and shape data of said plurality of reference objects, generated by said reference data generating means;

an image input means receiving an input image to be processed;

a reference image deform means receiving said input image supplied from said memory means, and said shape data of said plurality of reference objects, read out from said memory, and for executing a pattern matching processing between said input image and each of said shape data of said plurality of reference objects, to calculate the degree of similarity between said input image and each of said shape data of said plurality of reference objects, said reference image deform means also selecting, as candidate patterns, reference objects of a predetermined number counted from a reference object having the highest degree of similarity in the order of the degree of similarity, or reference objects having the degree of similarity larger than a predetermined threshold, said reference image deform means farther deforming each of said candidate patterns to make the candidate pattern coincident with said input image to a possible maximum extent using as a constraint condition said depth data read out from said memory;

an image segmentation means receiving said deformed reference image of each of said candidate patterns, outputted from said reference image deform means, and said input image supplied from said image input means, for segmenting said input image with reference with said deformed reference image of each of said candidate patterns; and a pattern discriminating means receiving the result of the segmentation outputted from said image segmentation means and said deformed reference image of each of said candidate patterns, outputted from said reference image deform means, for calculating the degree of final similarity between the extracted input image outputted from said image segmentation means and said deformed reference image of each of said candidate patterns, said pattern discriminating means outputting, when a highest one of the calculated degrees of final similarity exceeds a predetermined value, the result of discrimination indicating the pattern having said highest degree of final similarity.

10. A object discrimination system claimed in claim 9 wherein each of said reference data generating means and said image input means outputs executes a convolution integration based on a DoG function, to the received image, so as to process the convolutely integrated image data as a received image.

11. A object discrimination system claimed in claim 9 wherein said reference data generating means generates as said shape data, data of said predetermined one image of said received left and right images, or data obtained by executing a transform processing to said predetermined one image of said received left and right images.

\* \* \* \* \*